(12) United States Patent
Lee

(10) Patent No.: US 9,583,931 B2
(45) Date of Patent: Feb. 28, 2017

(54) BUSBAR KIT

(71) Applicant: I ELEC, INC., Seoul (KR)

(72) Inventor: Kangho Lee, Seoul (KR)

(73) Assignee: I ELEC, INC. (KR)

( * ) Notice: Subject to any disclaimer, the term of this patent is extended or adjusted under 35 U.S.C. 154(b) by 0 days.

(21) Appl. No.: 14/898,118

(22) PCT Filed: Jun. 12, 2014

(86) PCT No.: PCT/KR2014/005154
§ 371 (c)(1),
(2) Date: Dec. 11, 2015

(87) PCT Pub. No.: WO2014/200277
PCT Pub. Date: Dec. 18, 2014

(65) Prior Publication Data
US 2016/0149388 A1    May 26, 2016

(30) Foreign Application Priority Data

Jun. 12, 2013   (KR) .................. 10-2013-0067213

(51) Int. Cl.
*H02G 5/00* (2006.01)
*H02B 1/20* (2006.01)
*H02G 5/06* (2006.01)
*H02B 1/052* (2006.01)

(52) U.S. Cl.
CPC ............... *H02G 5/06* (2013.01); *H02B 1/052* (2013.01); *H02B 1/20* (2013.01)

(58) Field of Classification Search
CPC  H02G 5/00; H02G 5/02; H02G 5/025; H02G 5/06; H05K 5/00; H05K 5/02; H05K 5/0247; H05K 5/06; H02B 1/052; H02B 1/20; H02B 1/207; H02B 1/21
USPC .... 174/72 B, 68.2, 71 B, 88 B, 99 B, 129 B, 174/133 B, 149 B, 70 B; 361/611, 637, 361/648, 775
See application file for complete search history.

(56) References Cited

U.S. PATENT DOCUMENTS

| | | | | |
|---|---|---|---|---|
| 4,739,441 A | * | 4/1988 | Galletly | H02B 1/21 174/68.2 |
| 6,381,122 B2 | * | 4/2002 | Wagener | H02G 5/025 174/71 B |
| 6,489,567 B2 | * | 12/2002 | Zachrai | H02G 5/025 174/149 B |
| 6,506,068 B2 | * | 1/2003 | Wagener | H02G 5/00 174/88 B |
| 6,934,147 B2 | * | 8/2005 | Miller | H02B 1/21 174/68.2 |

(Continued)

FOREIGN PATENT DOCUMENTS

| | | |
|---|---|---|
| KR | 100566662 | 3/2006 |
| KR | 100759524 | 9/2007 |

(Continued)

*Primary Examiner* — Angel R Estrada

(57) ABSTRACT

A busbar kit is provided. The busbar kit electrically connects a circuit breaker and a main busbar, and comprises an insulating case having an inner space, a branch busbar disposed in the insulating case such that the branch busbar is spaced apart from the main busbar and crosses over the main busbar, and a busbar connector for electrically connecting the main busbar and the branch busbar.

14 Claims, 8 Drawing Sheets

(56) References Cited

U.S. PATENT DOCUMENTS

| | | | | |
|---|---|---|---|---|
| 7,334,315 B2* | 2/2008 | Wiant | ................. | H02B 1/21 |
| | | | | 174/68.2 |
| 9,006,571 B2* | 4/2015 | Manhart | ................. | H02B 1/21 |
| | | | | 174/129 B |

FOREIGN PATENT DOCUMENTS

| | | |
|---|---|---|
| KR | 100908111 | 7/2009 |
| KR | 101006463 | 1/2011 |
| KR | 101209892 | 12/2012 |

* cited by examiner

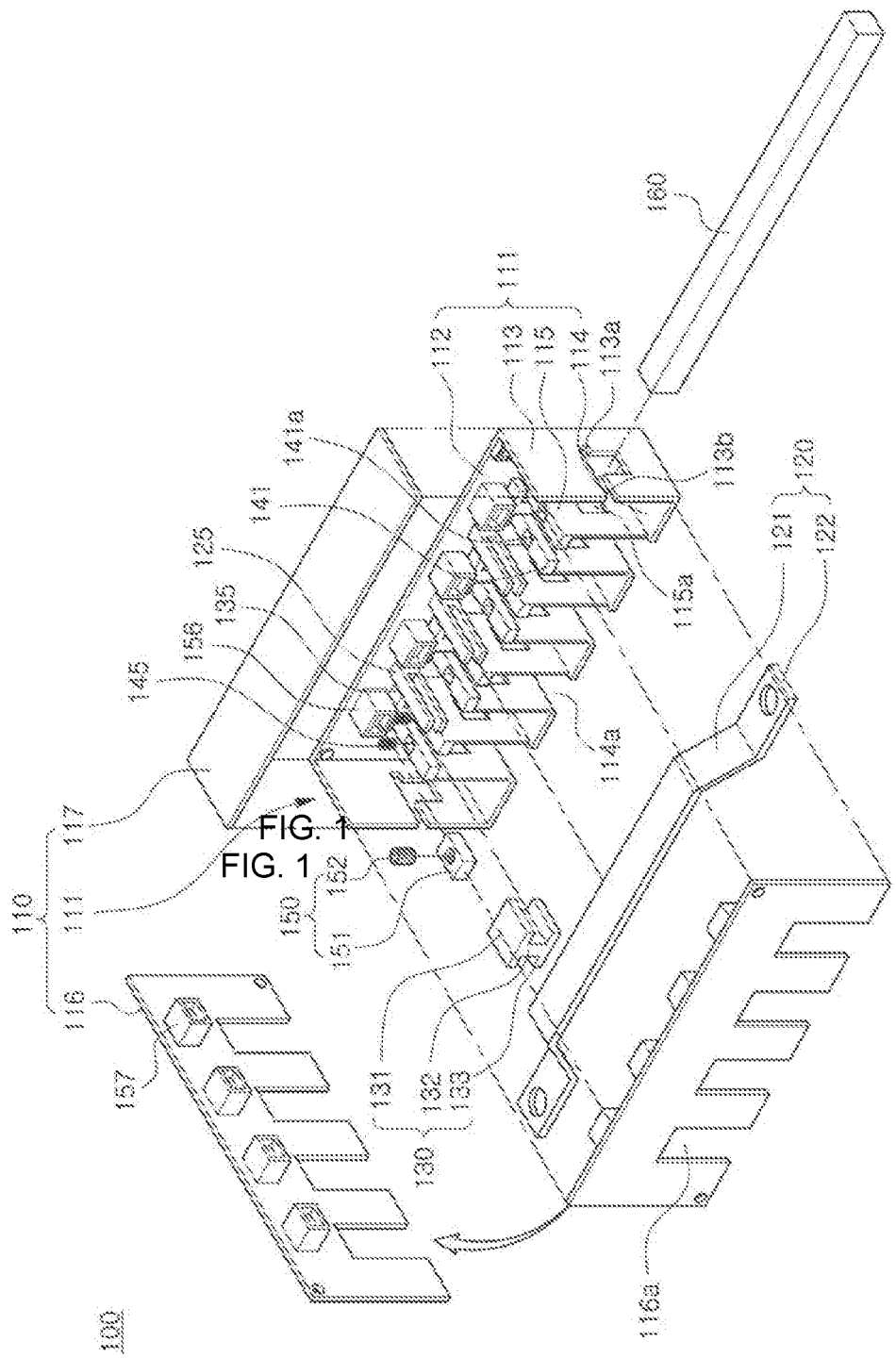

BUSBAR KIT

TECHNICAL FIELD

The present invention generally relates to a busbar kit.

BACKGROUND ART

In general, a distribution board distributes electric currents to factories, or to large-scale residential buildings such as apartments while interrupting overcurrent, which prevents electric accidents and protects electrical loads.

A conventional distribution board includes a main circuit breaker in which electric power is led from a power source and breaks circuits when necessary; a plurality of main busbars that come into contact with the terminals of the main circuit breaker that are connected to loads; a plurality of circuit breakers for distributing electric power supplied from the main circuit breaker to the loads; and the branch busbar that comes into contact with the main busbars and the terminals of the circuit breaker for distribution therebetween such that the branch busbar distributes the route of current supplied from the main busbars.

To connect the main busbars and the branch busbar to each other using screws, the conventional distribution board requires tap work in which a hole is cut through a screw and a threaded surface is formed in the inner circumferential surface of the hole. In addition, the tap work requires specific facilities, thereby making the manufacturing process of the distribution board complicated, and mass production thereof difficult. Furthermore, the conventional distribution board requires manual labor, and thus it requires time and manpower to manufacture, thereby increasing manufacturing cost. In addition, when the conventional distribution board is required to be modified for adding circuits during the manufacturing, on-site installation and use of the conventional distribution board, the hole work and tap work of the main busbars and the branch busbar makes it impossible to efficiently perform the modifications.

In recent years, the busbar kit including the branch busbar has been used such that the branch busbar is not exposed to outside. However, since it is not easy to mount the busbar kit to the distribution board, it requires much working time and manpower. Further, if any one of the components mentioned above malfunctions, all components including an adjacent busbar kit are required to be removed from the distribution board, which makes it difficult to repair and replace the component that is out of order.

DISCLOSURE

Technical Problem

Accordingly, the present invention has been made keeping in mind the above problems occurring in the related art, and the present invention is intended to propose a busbar kit that enables the manufacturing process of a distribution board to be simple, thereby making it possible to efficiently modify the distribution board.

The present invention proposes the busbar kit that can improve the performance of a distribution board.

Other objects of the present invention will become apparent from the following detailed description and the accompanying drawings.

Technical Solution

In order to achieve the above object, according to one aspect of the present invention, there is provided a busbar kit electrically connecting a circuit breaker and a main busbar, the busbar kit including: an insulating case having an inner space; a branch busbar arranged in the insulating case such that the branch busbar is spaced apart from the main busbar and crosses over the main busbar; and a busbar connector for electrically connecting the main busbar and the branch busbar.

The busbar connector may include: an upper member that comes into contact with the branch busbar; a lower member that comes into contact with the main busbar; and a connecting member connecting the upper member and the lower member to each other.

The insulating case may include: a front plate and a rear plate arranged parallel to each other; outer side plates connected to opposed ends of the front plate and the rear plate; an upper plate connected to upper edges of the front plate, the rear plate, and the outer side plates; a plurality of lower plates connected to lower edges of the front plate and the rear plate, and spaced apart from each other; and a plurality of inner side plates connected to edges of the lower plates and arranged parallel to the outer side plates, wherein the front plate and the rear plate have openings extending from opposite edges of the lower plates of the insulating case to the inner space of the insulating case such that areas between the inner side plates of neighboring elements defined by the inner side plates and the lower plates are exposed to a front side and a rear side of the insulating case.

The busbar kit may further include: a connector support mounted to the rear plate or to the inner side plates, the connector support being inserted between the upper member and the lower member of the busbar connector so as to support the busbar connector. The connector support may include: a spring support groove formed at a portion facing a lower surface of the upper member of the busbar connector; and a spring provided in the spring support groove so as to support the busbar connector.

First holes may be provided in the outer side plates, the first holes exposing the inner space to an outside, second holes may be provided at positions corresponding to the first holes in the inner side plates, and the busbar kit may further include a main busbar support rod inserted into the first holes and the second holes so as to support the main busbar.

The busbar kit may further include a branch busbar guide mounted to an inner surface of the insulating case, the branch busbar guide locking the branch busbar in the inner space.

The busbar kit may further include: a press unit provided on the branch busbar, the press unit bringing the branch busbar into contact with the busbar connector. The press unit may include a nut and a bolt.

The busbar kit may further include press unit supports mounted to an inner surface of the insulating case, the press unit supports having insert grooves into which predetermined portions of the press unit are inserted.

The insulating case may include: an insulating case body defining the inner space therein; and an upper plate mounted to upper edges of the insulating case body, wherein the upper plate is removably mounted to the insulating case body.

Advantageous Effects

According to exemplary embodiments of the present invention having the above-mentioned characteristics, it is possible to simply mount the busbar kit to a distribution board. In addition, the busbar kit can be easily removed from the distribution board. Accordingly, in case of the malfunction of the busbar kit, the malfunctioned busbar kit alone may be removed from the distribution board for repair or replacement. Accordingly, it is possible to simply manufacture the distribution board, and to efficiently modify the distribution board. Further, a branch busbar and a main busbar can be stably connected to each other by a busbar connector in the busbar kit, thereby improving the performance of the distribution board.

DESCRIPTION OF DRAWINGS

FIG. 2a is an exploded perspective view of one of the busbar kits according to the first embodiment of the present invention.

BEST MODE

Figure 1:
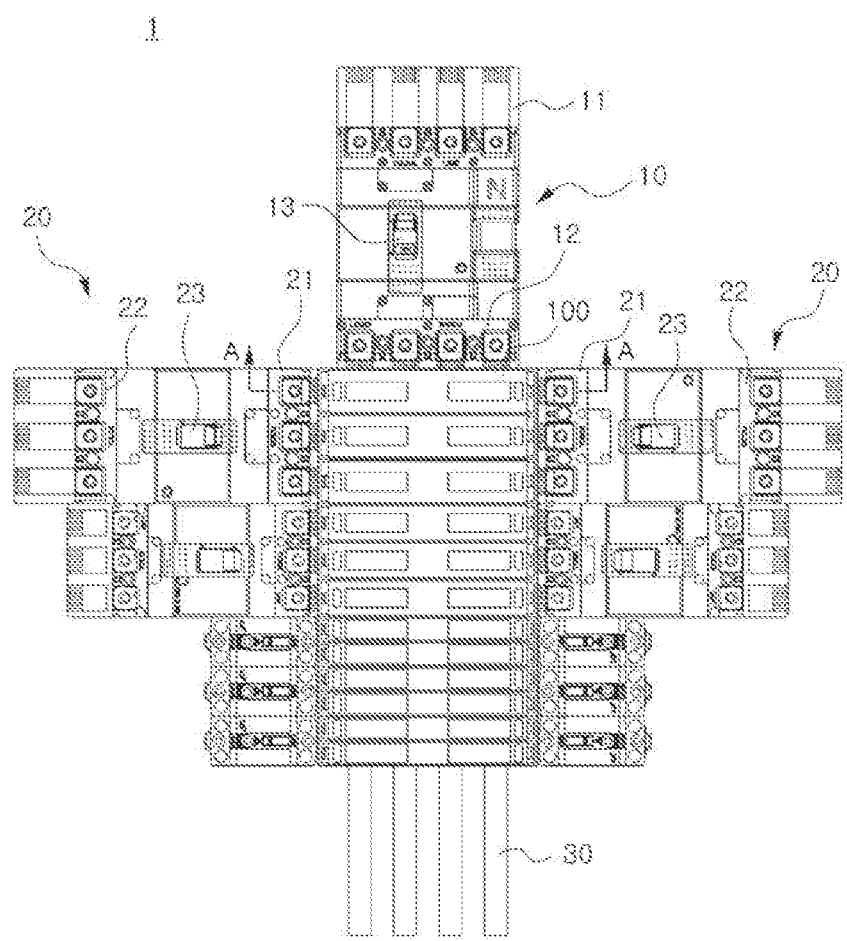
FIG. 1 is a top plan view of a distribution board having busbar kits according to a first embodiment of the present invention.

Hereinafter, the present invention will be described in detail by using embodiments. Objects, features and advantages of the present invention will be readily understood through the following examples. The present invention is not limited to the embodiments described herein, and may be embodied in other forms. The exemplary embodiments introduced herein are provided to make disclosed contents thorough and complete and to sufficiently transfer the spirit of the present invention to those skilled in the art of the present invention. Accordingly, the present invention is not to be limited by the following embodiments.

The size of the element or the relative sizes between elements in the drawings may be shown to be exaggerated for more clear understanding of the present invention. In addition, the shape of the elements shown in the drawings may be somewhat changed by variation of the manufacturing process or the like. Accordingly, the embodiments disclosed herein are not to be limited to the shapes shown in the drawings unless otherwise stated, and it is to be understood to include a certain amount of variation.

Though the embodiments of the present invention take the example of a distribution board, the present invention is not limited to the distribution board. The busbar kit according to the embodiments of the present invention may be applied to switchboards and low voltage distribution boards.

FIG. 1 is a top plan view of a distribution board having busbar kits 100 according to a first embodiment of the present invention.

Referring to FIG. 1, the distribution board 1 may include a first circuit breaker 10, second circuit breakers 20, main busbars 30, and the busbar kits 100. The components of the distribution board 1 including the first circuit breaker 10, the second circuit breakers 20, the main busbars 30, and the busbar kits 100 are included in an enclosure (not shown) and thus can be protected from an outside. The enclosure may include main plates on which the components are arranged, and an upper plate mounted to the main plates, the upper plate covering the components.

The first circuit breaker 10 is a main circuit breaker, and the single first circuit breaker 10 may be included in one distribution board 1. The first circuit breaker 10 may include a power source terminal assembly 11, a load terminal assembly 12, and a cut-out switch 13. The power source terminal assembly 11 is a terminal assembly to come into contact with the power source, and the load terminal assembly 12 is a terminal assembly to come into contact with loads. The power source may refer to an electric power supply (not shown) or an electric power lead-in wire (not shown), while the loads may refer to the main busbars 30 or the second circuit breakers 20. The cut-out switch 13 can start or stop electric current flow between the power source terminal assembly 11 and the load terminal assembly 12.

The second circuit breakers 20 are circuit breakers for distribution, and a plurality of second circuit breakers 20 may be included in one distribution board 1. The second circuit breakers 20 may include: power source terminal assemblies 21 to come into contact with the power source; a load terminal assembly 22 to come into contact with the loads; and a cut-out switch 23. The cut-out switch 23 can start or stop electric current flow between the power source terminal assemblies 21 and the load terminal assembly 22. The second circuit breakers 20 distribute electric power supplied from the first circuit breaker 10 to the loads.

The main busbars 30 electrically come into contact with the load terminal assembly 12 of the first circuit breaker 10. The main busbars 30 are made of conductive materials, and arranged to correspond to an alternating current phase and a neutral phase respectively. For example, each of the main busbars 30 is arranged to correspond to the alternating current R, S, T, and neutral phase (N), each of which is spaced apart from each other.

The busbar kits 100 are arranged to cross the main busbars 30. The busbar kits 100 electrically connect the main busbars 30 and the second circuit breakers 20 to each other. For example, when the second circuit breakers 20 are three-phase three-wire circuit breakers, three busbar kits 100 may be connected to the second circuit breakers 20.

Colored labels for identifying respective phases may be attached on an upper plate 117 of each of the busbar kits 100. For example, a black label for an R phase, a red label for an S phase, a blue label for a T phase, and white or gray label for an N phase may be attached.

Figure 2B:
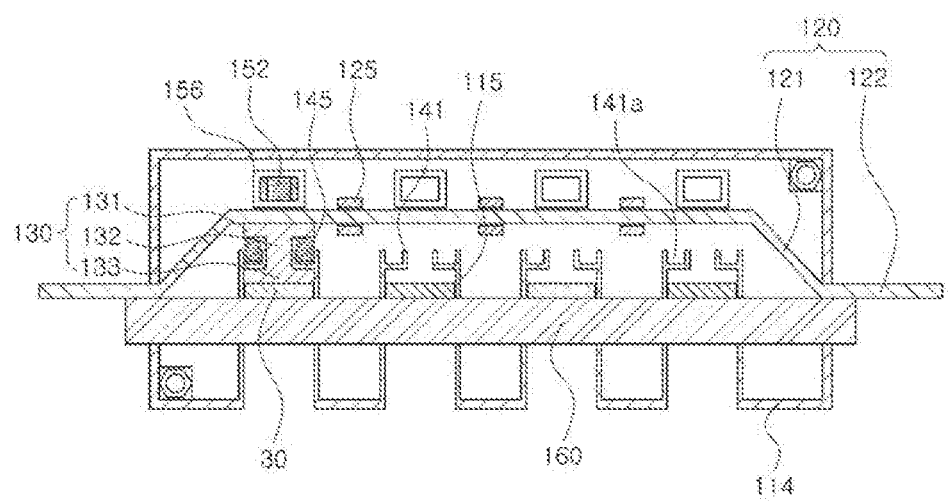
FIG. 2b is a cross-sectional view taken along line A-A of FIG. 1.

FIG. 2a is an exploded perspective view of one of the busbar kits 100 according to the first embodiment of the present invention, and FIG. 2b is a cross-sectional view of the busbar kit taken along line A-A of FIG. 1.

Referring to FIGS. 2a and 2b, the busbar kit 100 may include an insulating case 110, a branch busbar 120, and busbar connectors 130.

The insulating case 110 may include an insulating case body 111, a front plate 116, and the upper plate 117.

The insulating case body 111 may include a rear plate 112, outer side plates 113, lower plates 114, and inner side plates 115.

Components of the busbar kit 100 such as branch busbar guides 125, connector support plates 135, connector supports 141, and first press unit supports 156 are mounted to the rear plate 112. The rear plate 112 may have a configuration corresponding to the front plate 116.

The outer side plates 113 may include first holes 113a. The first holes 113a may have upper spaces and lower spaces therein that are different from each other in width. The width of each of the upper spaces may be larger than the width of each of the lower spaces. The upper spaces of the first holes 113a may include insertion holes 113b extending to portions that come into contact with the front plate 116. Connecting parts 122 of the branch busbar 120 are inserted into the insertion holes 113*b* such that the branch busbar 120 can be efficiently mounted to the insulating case 110. The connecting parts 122 of the branch busbar 120 may be exposed to the outside of the insulating case 110 through the first holes 113*a*. The main busbar support rod 160 may be inserted into the lower spaces of the first holes 113*a*.

A plurality of lower plates 114 are spaced apart from each other, and arranged parallel to each other. Further, the plurality of inner side plates 115 connected to respective edges of the lower plates 114 may be arranged parallel to the outer side plates 113. The inner side plates 115 may include second holes 115*a*. The second holes 115*a* correspond to the lower spaces of the first holes 113*a*, and thus the main busbar support rod 160 may be inserted into the first holes 113*a* and the second holes 115*a*. The main busbars 30 can be inserted into areas 114*a* defined between the inner side plates 115 of neighboring elements defined by the inner side plates 115 and the lower plates 114. Before the main busbar support rod 160 is inserted into the busbar kit 100, the busbar kit 100 is arranged in the distribution board (refer to 1 of FIG. 1) such that the main busbars 30 may be inserted into the areas 114*a*. And then, the main busbar support rod 160 is inserted into the first holes 113*a* of the outer side plates 113 and into the second holes 115*a* of the inner side plates 115, and thus the busbar kit 100 may be mounted to the distribution board. Accordingly, the busbar kit 100 may be efficiently and removably mounted to the distribution board due to the configuration of the insulating case 110 including a plurality of lower plates 114 and the inner side plates 115 defining the areas 114*a* into which the main busbars 30 can be inserted.

The front plate 116 is arranged in a front side of the insulating case body 111 so as to cover the front side. The front plate 116 may have a plurality of recessed areas 116*a* extending from opposite edges of the lower plates of the insulating case to an inner space of the insulating case. The recessed areas 116*a* are arranged to correspond to the areas 114*a*. The front plate 116 may have threaded holes at portions of edges of the front plate, and thus, bolts are inserted into the holes, thereby mounting the front plate to the insulating case body 111.

The upper plate 117 is mounted to upper edges of the insulating case body 111 to cover an upper part of the insulating case body. The upper plate 117 can be removably mounted to the insulating case body 111 by a slide or one-touch method on upper edges of the insulating case body 111.

The branch busbar 120 may include a body part 121 and the connecting parts 122. The body part 121 may have a thin bar shape, ends of which are bent, such that the body part 121 can be arranged in a predetermined inner space of the insulating case 110. The connecting parts 122 are exposed to the outside through the first holes 113*a* of the outer side plates 113 such that the connecting parts 122 may come into contact with the power source terminal assemblies 21 of the second circuit breakers 20.

Each of the busbar connectors 130 is arranged between the branch busbar 120 and each of the main busbars 30 so as to electrically connect the branch busbar 120 and the main busbar 30 to each other. The busbar connector 130 may include an upper member 131, a connecting member 132, and a lower member 133. The upper member 131 is arranged under the branch busbar 120 so as to come into contact with a lower surface of the branch busbar 120, and the lower member 133 is arranged on the main busbar 30 so as to come into contact with an upper surface of the main busbar 30.

The connecting member 132 may connect midpoints of the upper member 131 and the lower member 133 to each other.

Each of the connector supports 141 is arranged between the upper member 131 and the lower member 133 of the busbar connector 130 so as to support the busbar connector 130. The connector support 141 may be arranged at each side or one side of the connecting member 132 of the busbar connector 130. The connector support 141 may be mounted to at least any one of the rear plate 112 and each of the inner side plates 115 so as to be stably mounted in the insulating case 110.

The connector support 141 may have a spring support groove 141*a* that holds a spring 145. The spring 145 provided in the spring support groove 141*a* supports the upper member 131 so as to elastically support the busbar connector 130.

Each of branch busbar guides 125 is mounted to the rear plate 112 so as to be fixed in the insulating case 110. The branch busbar guide 125 enables the branch busbar 120 to be unwaveringly and stably mounted in the insulating case 110.

Each of connector support plates 135 may be mounted to the rear plate 112 so as to correspond to the busbar connector 130. The connector support plate 135 may have the same shape as the busbar connector 130, and act as a substitute of a predetermined portion of the busbar connector 130. Accordingly, a length of the busbar connector 130 may be shortened to a length of the connector support plate 135.

Each of first press unit supports 156 may be mounted to the rear plate 112 over the connector support plate 135, and each of second press unit supports 157 may be mounted to a front plate 116 so as to correspond to the first press unit supports 156. The first and second press unit supports 156, 157 may have insert grooves into which predetermined portions of each of press units 150 can be inserted.

Each of press units 150 may include a nut 151 and a bolt 152. A first end part of the nut 151 may be inserted into the insert groove of the first press unit support 156, and a second end part of the nut 151 may be inserted into the insert groove of the second press unit support 157. A hole of the nut 151 may be exposed between the first press unit support 156 and the second press unit support 157, and the bolt 152 can be inserted into the hole. The bolt 152 presses the branch busbar 120 so as to bring the branch busbar 120 into close contact with the busbar connector 130.

Figure 3A:
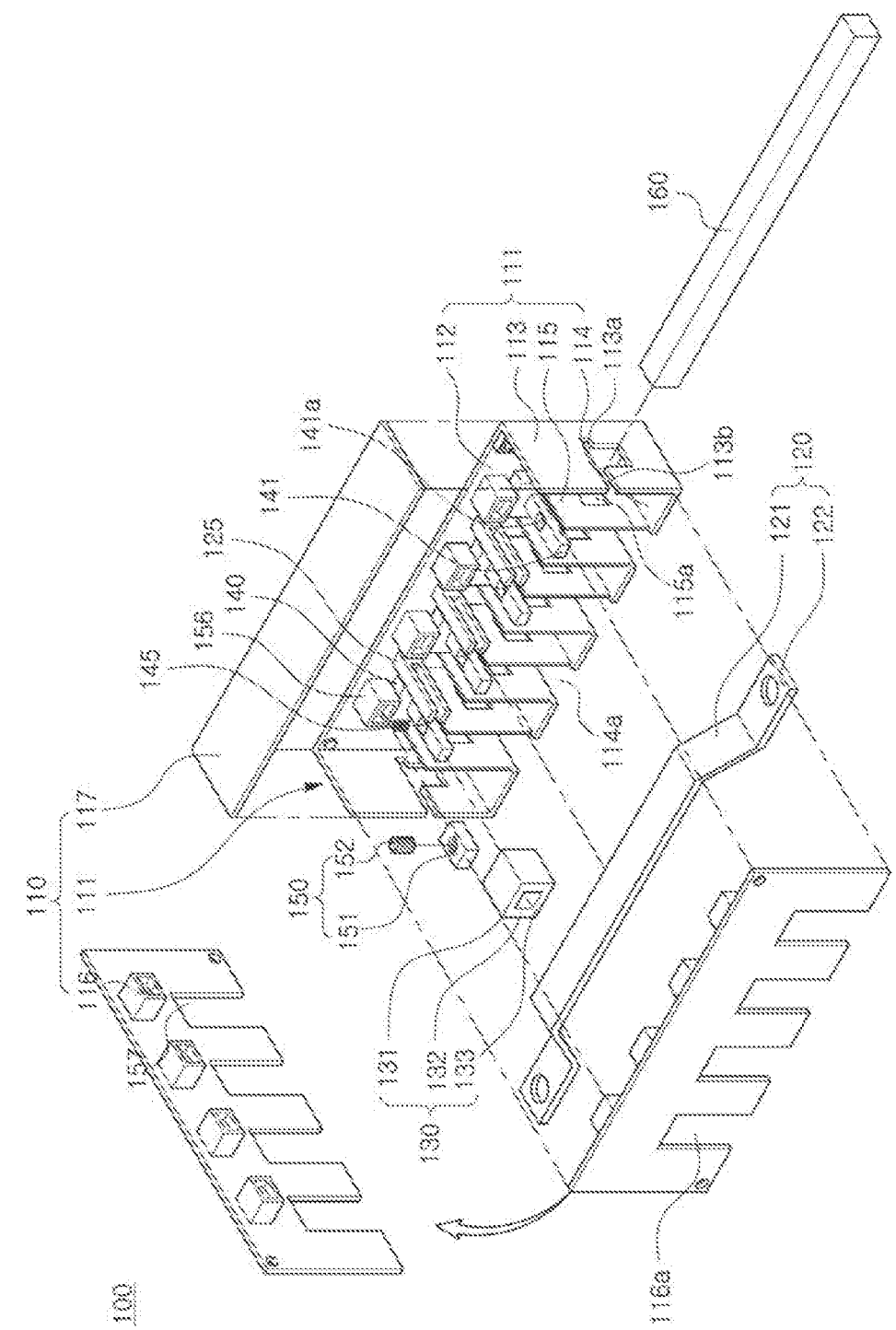
FIG. 3a is an exploded perspective view of a busbar kit according to a second embodiment of the present invention.
Figure 3B:
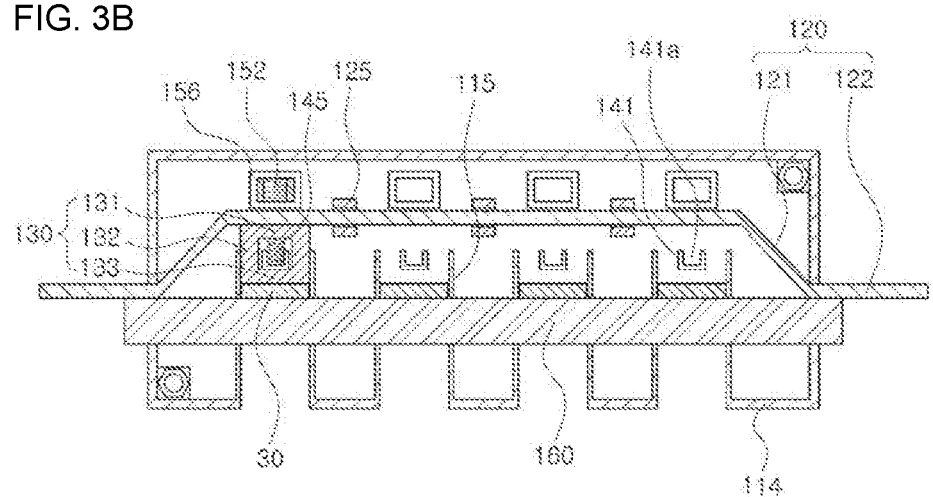
FIG. 3b is a cross-sectional view taken along line A-A of FIG. 1.

FIG. 3*a* is an exploded perspective view of a busbar kit according to a second embodiment of the present invention, and FIG. 3*b* is a cross-sectional view taken along the line A-A of FIG. 1.

Referring to FIGS. 3*a* and 3*b*, connecting members 132 of each of busbar connectors 130 can connect opposed ends of an upper member 131 and a lower member 133 to each other. Each of connector support 141 can be inserted into a space defined by the upper member 131, the connecting members 132, and the lower member 133. The connector support 141 are arranged between inner side plates 115 and mounted to a rear plate 112. The connector support 141 may have a spring support groove 141*a* that holds a spring 145. The spring 145 provided in the spring support groove 141*a* of the connector support 141 supports the upper member 131 so as to elastically support the busbar connector 130.

FIGS. 4 to 11 are cross-sectional views of busbar kits according to other embodiments of the present invention.

Figure 4:
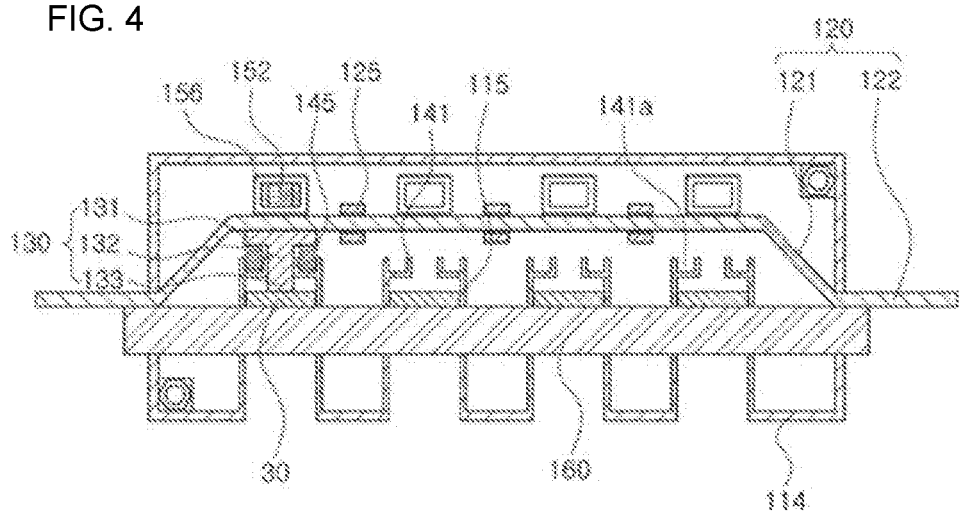
FIGS. 4 to 11 are cross-sectional views of busbar kits according to other embodiments of the present invention.

Referring to FIG. 4, a connecting member 132 and a lower member 133 of each of busbar connectors 130 may be the same in width. Connector supports 141 may have spring support grooves 141*a* that hold springs 145. The springs 145 provided in the spring support grooves 141*a* of the connector supports 141 support an upper member 131 so as to elastically support the busbar connector 130.

Figure 5:
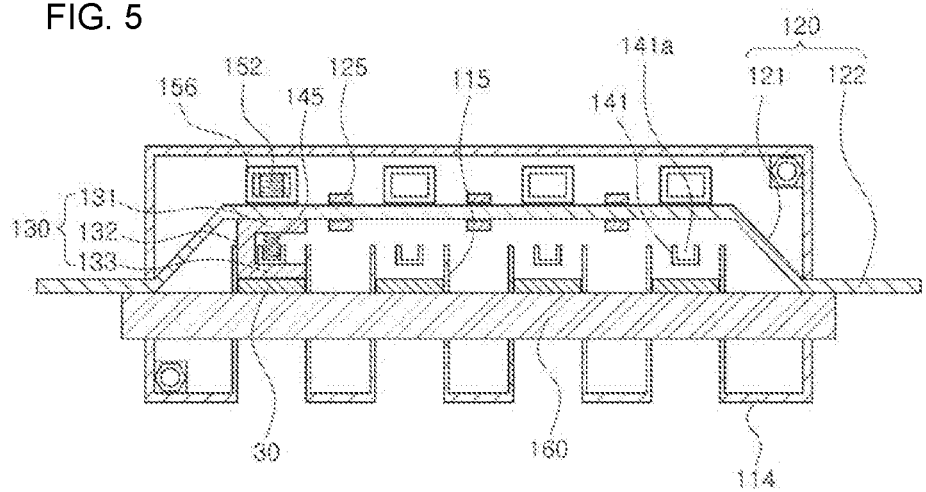

Referring to FIG. 5, a connecting member 132 of each of busbar connectors 130 can connect any one pair of two pairs of opposed ends of an upper member 131 and a lower member 133. Each of connector supports 141 may be arranged at one side of the connecting member 132 between the upper member 131 and the lower member 133. The connector support 141 may have a spring support groove 141a that holds a spring 145. The spring 145 provided in the spring support groove 141a of the connector support 141 supports the upper member 131 so as to elastically support the busbar connector 130.

Figure 6:
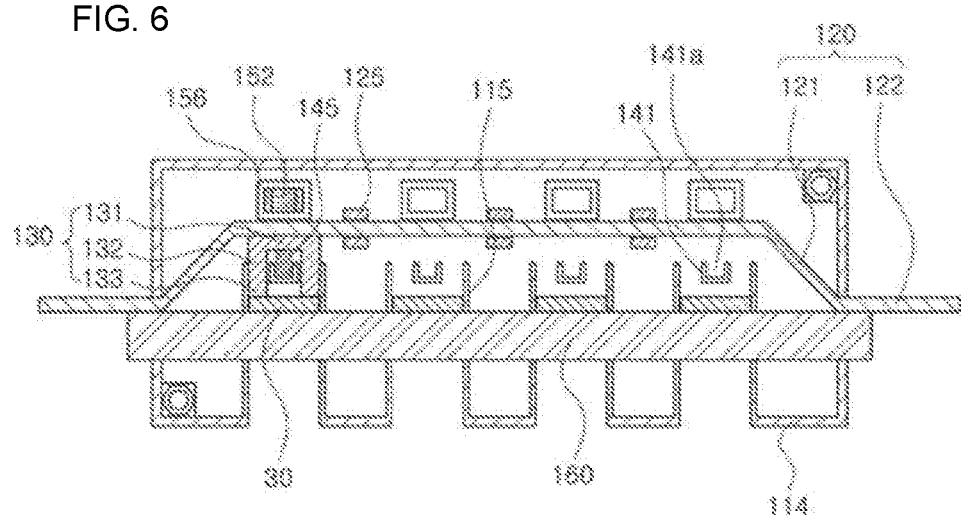

Referring to FIG. 6, each of busbar connectors 130 may include two lower members 133 that are separated from each other. Two of connecting members 132 can connect opposite end parts of an upper member 131 and the two lower members 133 that are separated from each other. Each of connector supports 141 can be inserted into a space defined by the upper member 131 and the two connecting members 132. The connector support 141 may have a spring support groove 141a that holds a spring 145. The spring 145 provided in the spring support groove 141a of the connector support 141 supports the upper member 131 so as to elastically support the busbar connector 130.

Figure 7:
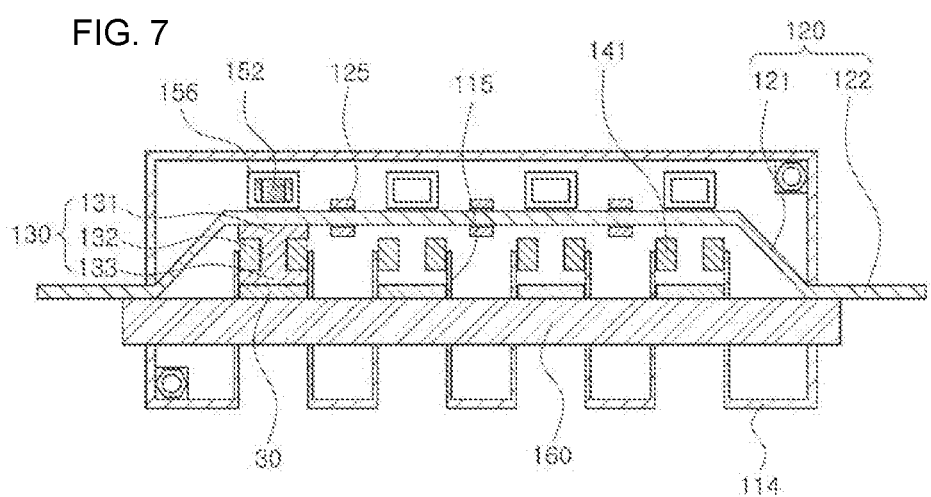

Referring to FIG. 7, connector supports 141 can be inserted into spaces defined by an upper member 131, a connecting member 132, and a lower member 133 of each of busbar connectors 130. The connector supports 141 may come into contact with a lower surface of the upper member 131, side surfaces of the connecting member 132, and an upper surface of the lower member 133. The connector supports 141 may be arranged at each side of the connecting member 132 or at any one side thereof. The connector supports 141 may or may not include either or both of a spring 145 and a spring support groove 141a.

Figure 8:
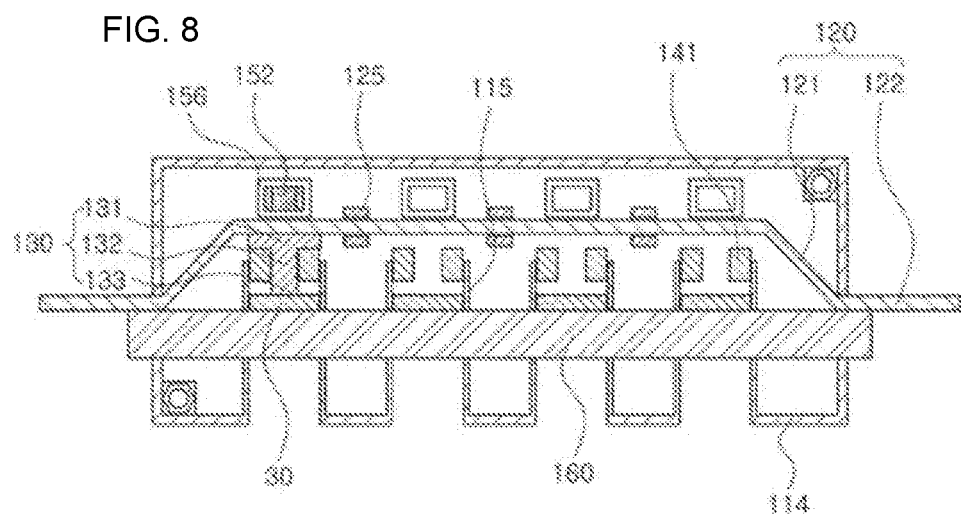

Referring to FIG. 8, a connecting member 132 and a lower member 133 of each of busbar connectors 130 may be the same in width. Connector supports 141 may come into contact with a lower surface of an upper member 131 of the busbar connector 130 and side surfaces of the connecting members 132. The connector supports 141 may be arranged at each side or any one side of the connecting member 132.

Figure 9:
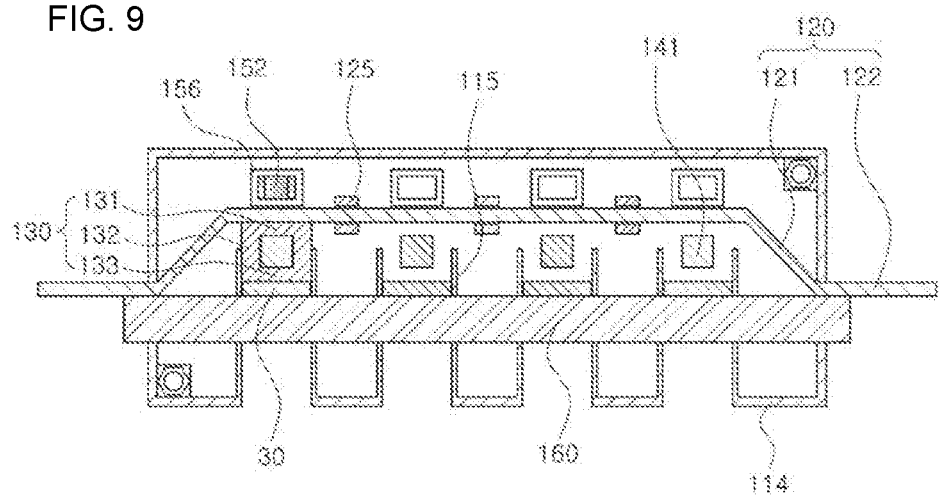

Referring to FIG. 9, connecting members 132 of each of busbar connectors 130 can connect opposed ends of an upper member 131 and a lower member 133 to each other. Each of connector supports 141 can be inserted into a space defined by the upper member 131, the connecting members 132, and the lower member 133. An outer surface of the connector support 141 may come into contact with inner surfaces of the busbar connector 130.

Figure 10:
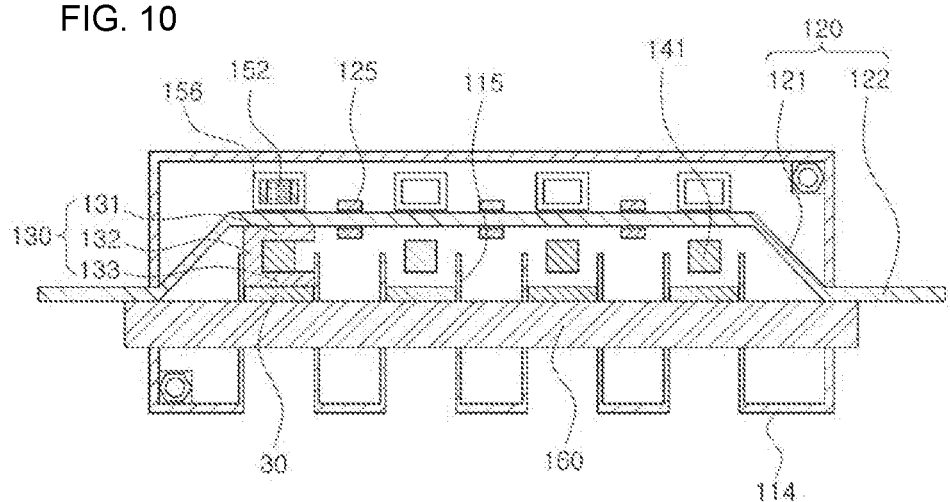

Referring to FIG. 10, a connecting member 132 of each of busbar connectors 130 can connect any one pair of two pairs of opposed ends of an upper member 131 and a lower member 133 of the busbar connector 130 to each other. Each of connector supports 141 is arranged at one side of the connecting member 132 between the upper member 131 and the lower member 133.

Figure 11:
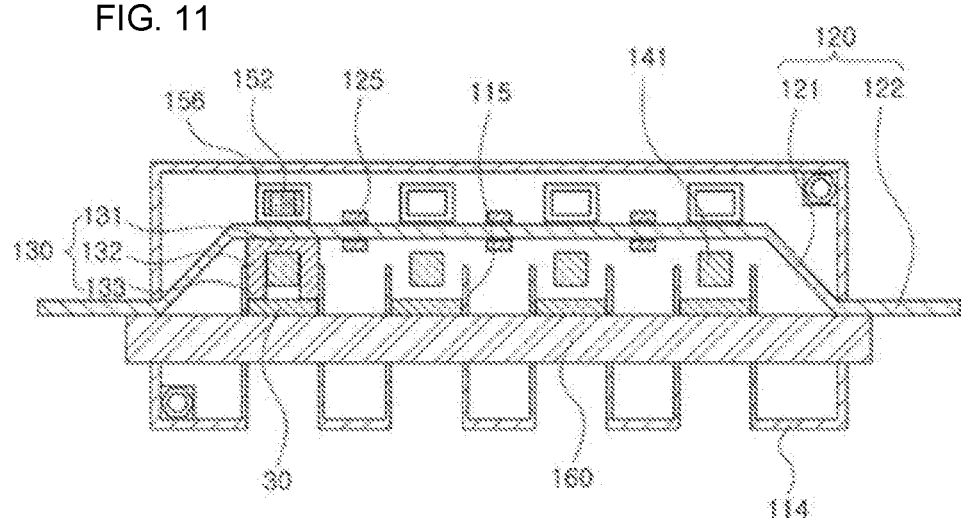

Referring to FIG. 11, each of busbar connectors 130 may include two lower members 133 that are separated from each other. Connecting members 132 can connect opposite ends of an upper member 131 and the two lower members 133 that are separated from each other. Each of connector supports 141 can be inserted into a space defined by the upper member 131 and the two connecting members 132.

Figure 12A:
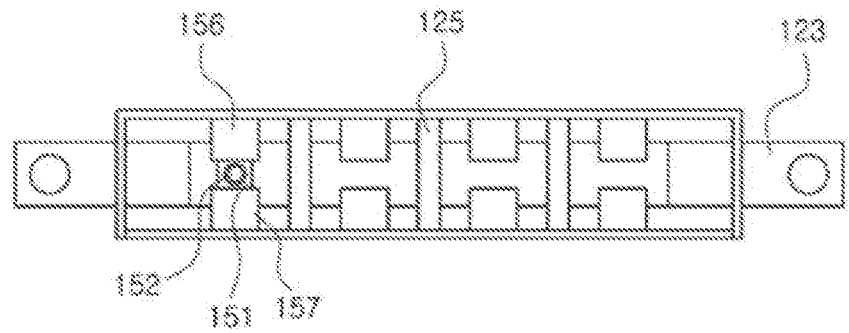
FIGS. 12a to 12c are top plan views of the busbar kits according to the embodiments of the present invention.
Figure 12B:
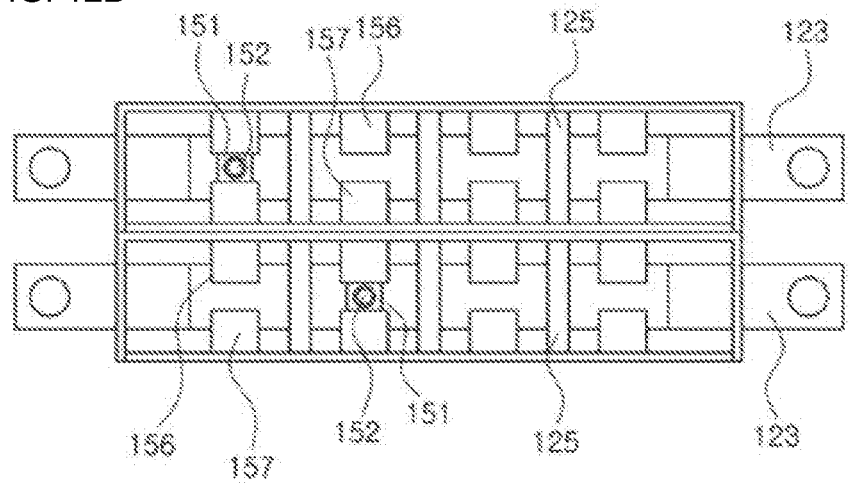
Figure 12C:
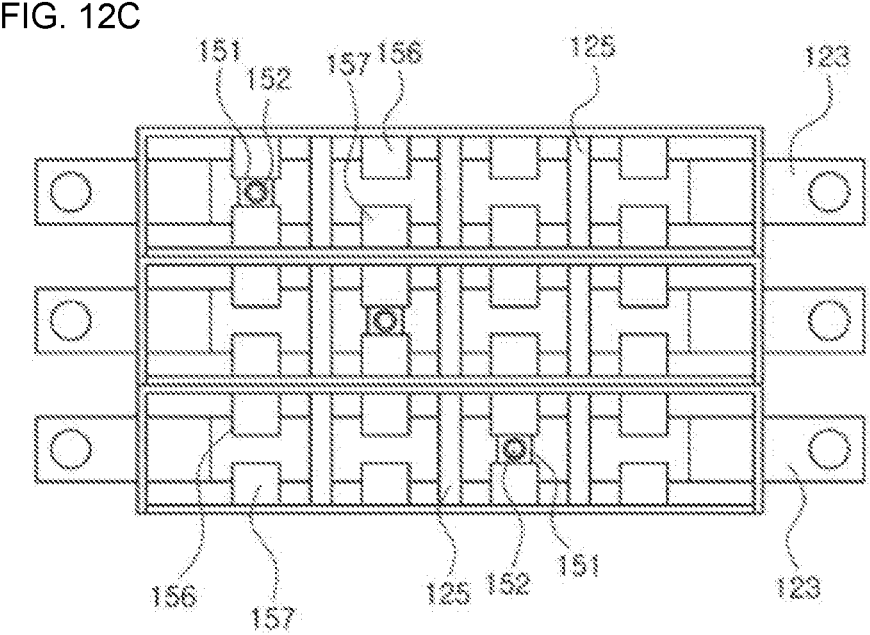

FIGS. 12a to 12c are top plan views of the busbar kits 100 according to the embodiments of the present invention.

Referring to FIGS. 12a to 12c, the busbar kits 100 may be manufactured in keeping with phases, that is, one busbar kit 100 may be manufactured in keeping with one phase, two busbar kits 100 in combination may be manufactured in keeping with two phases, or three busbar kits 100 in combination may be manufactured in keeping with three phases.

The various embodiments of the present invention have been described in detail up to now. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL AVAILABILITY

The busbar kit according to the embodiments of the present invention may be applied to distribution boards, switchboards, and low voltage distribution boards.

The invention claimed is:

1. A busbar kit electrically connecting a circuit breaker and a main busbar, the busbar kit comprising:
    an insulating case having an inner space;
    a branch busbar arranged in the insulating case such that the branch busbar is spaced apart from the main busbar and crosses over the main busbar; and
    a busbar connector for electrically connecting the main busbar and the branch busbar,
    wherein the busbar connector includes: an upper member that comes into contact with the branch busbar; a lower member that comes into contact with the main busbar; and a connecting member connecting the upper member and the lower member to each other.

2. The busbar kit of claim 1, wherein the insulating case comprises:
    a front plate and a rear plate arranged parallel to each other;
    outer side plates connected to opposed ends of the front plate and the rear plate;
    an upper plate connected to upper edges of the front plate, the rear plate, and the outer side plates;
    a plurality of lower plates connected to lower edges of the front plate and the rear plate, and spaced apart from each other; and
    a plurality of inner side plates connected to edges of the lower plates and arranged parallel to the outer side plates, wherein the front plate and the rear plate have recessed areas extending from opposite edges of the lower plates of the insulating case to the inner space of the insulating case such that areas between the inner side plates of neighboring elements defined by the inner side plates and the lower plates are exposed to a front side and a rear side of the insulating case.

3. The busbar kit of claim 2, further comprising: a connector support mounted to the rear plate or to the inner side plates, the connector support being inserted between the upper member and the lower member of the busbar connector so as to support the busbar connector.

4. The busbar kit of claim 3, wherein the connector support comprises: a spring support groove formed at a portion facing a lower surface of the upper member of the busbar connector; and a spring provided in the spring support groove so as to support the busbar connector.

5. The busbar kit of claim 2, further comprising:
    first holes provided in the outer side plates, the first holes exposing the inner space to an outside; second holes provided at positions corresponding to the first holes in the inner side plates; and a main busbar support rod inserted into the first holes and the second holes so as to support the main busbar.

6. The busbar kit of claim 1, further comprising:
a branch busbar guide mounted to an inner surface of the insulating case, the branch busbar guide locking the branch busbar in the inner space.

7. The busbar kit of claim 1, further comprising:
a press unit provided on the branch busbar, the press unit bringing the branch busbar into contact with the busbar connector, wherein the press unit includes a nut and a bolt.

8. The busbar kit of claim 7, further comprising:
press unit supports mounted to an inner surface of the insulating case, the press unit supports having insert grooves into which predetermined portions of the press unit are inserted.

9. The busbar kit of claim 1, wherein the insulating case comprises: an insulating case body defining the inner space therein; and an upper plate mounted to upper edges of the insulating case body, wherein the upper plate is removably mounted to the insulating case body.

10. A busbar kit electrically connecting a circuit breaker and a main busbar, the busbar kit comprising:
an insulating case having an inner space;
a branch busbar arranged in the insulating case such that the branch busbar is spaced apart from the main busbar and crosses over the main busbar; and
a busbar connector disposed between the branch busbar and the main busbar for electrically connecting the main busbar and the branch busbar, wherein the busbar connector includes: an upper member that comes into contact with the branch busbar; a lower member that comes into contact with the main busbar; and a connecting member connecting the upper member and the lower member to each other.

11. The busbar kit of claim 10, wherein the insulating case comprises:
a front plate and a rear plate arranged parallel to each other;
outer side plates connected to opposed ends of the front plate and the rear plate;
an upper plate connected to upper edges of the front plate, the rear plate, and the outer side plates;
a plurality of lower plates connected to lower edges of the front plate and the rear plate, and spaced apart from each other; and
a plurality of inner side plates connected to edges of the lower plates and arranged parallel to the outer side plates, wherein the front plate and the rear plate have recessed areas extending from opposite edges of the lower plates of the insulating case to the inner space of the insulating case such that areas between the inner side plates of neighboring elements defined by the inner side plates and the lower plates are exposed to a front side and a rear side of the insulating case.

12. The busbar kit of claim 11, further comprising: a connector support mounted to the rear plate or to the inner side plates, the connector support being inserted between the upper member and the lower member of the busbar connector so as to support the busbar connector.

13. The busbar kit of claim 12, wherein the connector support comprises: a spring support groove formed at a portion facing a lower surface of the upper member of the busbar connector; and a spring provided in the spring support groove so as to support the busbar connector.

14. The busbar kit of claim 11, further comprising:
first holes provided in the outer side plates, the first holes exposing the inner space to an outside; second holes provided at positions corresponding to the first holes in the inner side plates; and a main busbar support rod inserted into the first holes and the second holes so as to support the main busbar.

\* \* \* \* \*